US010015089B1

(12) United States Patent
Gonzalez et al.

(10) Patent No.: US 10,015,089 B1
(45) Date of Patent: Jul. 3, 2018

(54) ENHANCED NODE B (ENB) BACKHAUL NETWORK TOPOLOGY MAPPING

(71) Applicant: Sprint Communications Company L.P., Overland Park, KS (US)

(72) Inventors: Jose A. Gonzalez, Maitland, FL (US); Brian D. Lushear, Winter Springs, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 137 days.

(21) Appl. No.: 15/139,293

(22) Filed: Apr. 26, 2016

(51) Int. Cl.
| | |
|---|---|
| *G06F 11/00* | (2006.01) |
| *G06F 11/07* | (2006.01) |
| *H04L 12/24* | (2006.01) |
| *H04L 12/741* | (2013.01) |
| *H04L 12/46* | (2006.01) |
| *H04L 12/26* | (2006.01) |
| *H04Q 11/00* | (2006.01) |
| *H04W 24/04* | (2009.01) |
| *H04B 10/2575* | (2013.01) |

(52) U.S. Cl.
CPC ....... *H04L 45/74* (2013.01); *H04B 10/25753* (2013.01); *H04L 12/4641* (2013.01); *H04L 41/0631* (2013.01); *H04L 41/0853* (2013.01); *H04L 41/12* (2013.01); *H04L 43/0876* (2013.01); *H04Q 11/0066* (2013.01); *H04W 24/04* (2013.01); *H04Q 2011/009* (2013.01); *H04Q 2011/0079* (2013.01)

(58) Field of Classification Search
None
See application file for complete search history.

(56) References Cited

U.S. PATENT DOCUMENTS

| | | | |
|---|---|---|---|
| 5,371,883 A | 12/1994 | Gross et al. | |
| 6,336,035 B1 * | 1/2002 | Somoza | H04W 16/18 455/423 |

(Continued)

OTHER PUBLICATIONS

Jadunandan, Kevin V., et al., entitled, "Communication Network Operations Management System and Method," filed Oct. 23, 2015, U.S. Appl. No. 14/920,874.

(Continued)

*Primary Examiner* — Kevin C Harper
*Assistant Examiner* — Derrick V Rose

(57) ABSTRACT

A method of managing a mobile communication radio access network (RAN). The method comprises reading information about network equipment from a network equipment inventory data store by an application executing on a computer system and, based on the information about network equipment read from the network equipment inventory data store, determining a backhaul network topology by the application, wherein a plurality of donor enhanced node B (eNB) devices provide backhaul communication coupling to one or more local exchange carrier (LEC) to a plurality of eNB devices. The method further comprises analyzing a performance history of the network equipment by the application based on the backhaul network topology and adapting a build-out of new equipment being added to extend the network equipment based on the analyzing of the performance history.

20 Claims, 7 Drawing Sheets

(56) References Cited

U.S. PATENT DOCUMENTS

| | | | |
|---|---|---|---|
| 7,295,119 B2* | 11/2007 | Rappaport | G06F 17/509 340/5.8 |
| 9,753,800 B1 | 9/2017 | Jadunandan et al. | |
| 9,912,547 B1 | 3/2018 | Douberley et al. | |
| 9,928,055 B1 | 3/2018 | Douberley et al. | |
| 2001/0015980 A1* | 8/2001 | Ramfelt | H04J 3/1611 370/404 |
| 2005/0207347 A1* | 9/2005 | Ishinishi | H04L 41/0806 370/241 |
| 2006/0233310 A1 | 10/2006 | Adams et al. | |
| 2007/0038676 A1 | 2/2007 | Nagral et al. | |
| 2007/0129009 A1* | 6/2007 | Jeong | H04L 12/66 455/12.1 |
| 2008/0181100 A1 | 7/2008 | Yang et al. | |
| 2008/0270997 A1 | 10/2008 | Murray et al. | |
| 2009/0170472 A1 | 7/2009 | Chapin et al. | |
| 2010/0005341 A1 | 1/2010 | Agarwal et al. | |
| 2010/0144367 A1 | 6/2010 | Goh et al. | |
| 2010/0322227 A1* | 12/2010 | Luo | H04B 7/024 370/345 |
| 2011/0140911 A1 | 6/2011 | Pant et al. | |
| 2013/0138538 A1 | 5/2013 | Perry | |
| 2013/0238471 A1 | 9/2013 | Maraz et al. | |
| 2013/0304530 A1 | 11/2013 | Chodavarapu et al. | |
| 2014/0325000 A1 | 10/2014 | Lorch et al. | |
| 2016/0179598 A1 | 6/2016 | Lvin et al. | |

OTHER PUBLICATIONS

Notice of Allowance dated Nov. 1, 2017, U.S. Appl. No. 14/920,873, filed Oct. 23, 2015.

FAIPP Pre-Interview Communication dated May 4, 2017, U.S. Appl. No. 14/922,103, filed Oct. 23, 2015.

Final Office Action dated Aug. 28, 2017, U.S. Appl. No. 14/922,103, filed Oct. 23, 2015.

Advisory Action dated Nov. 3, 2017, U.S. Appl. No. 14/922,103, filed Oct. 23, 2015.

Notice of Allowance dated Nov. 22, 2017, U.S. Appl. No. 14/922,103, filed Oct. 23, 2015.

Douberley, David N., et al., entitled, "Computer Platform to Collect, Marshal, and Normalize Communication Network Data for Use by a Network Operation Center (NOC) Management System," filed Oct. 23, 2015, U.S. Appl. No. 14/920,873.

Douberley, David N., et al., entitled, "Validating Development Software by Comparing Results From Processing Historic Data Sets," filed Oct. 23, 2015, U.S. Appl. No. 14/922,103.

Notice of Allowance dated Apr. 24, 2017, U.S. Appl. No. 14/920,874, filed Oct. 23, 2015.

* cited by examiner

ENHANCED NODE B (ENB) BACKHAUL NETWORK TOPOLOGY MAPPING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication network may comprise a radio access network (RAN) and a core network which are communicatively coupled to one another. The RAN and core network may be maintained by a service provider and comprise a variety of network equipment items. Some enhanced node Bs (eNBs) may be communicatively coupled to the core network (e.g., to a local exchange carrier (LEC)) by a fiber optic line or other transmission line. Other eNBs may be communicatively coupled to the core network via a radio link to another eNB that is communicatively coupled by fiber optic line or other transmission line to the core network. The eNBs that are coupled to the core network by fiber or other transmission line and that couple other eNBs via radio link to the core network may be referred to as donor eNBs. The eNBs that are coupled to the core network via radio link to a donor eNB may be referred to as child eNBs.

These network equipment items in the service provider network may be manufactured by different vendors and original equipment manufacturers (OEMs). Network management systems (NMSs) or element management systems (EMSs) that are provided by different vendors to manage these items of network equipment may use different formats to represent state of the network equipment and have different operating procedures that differ from equipment item to equipment item, from a first EMS to a second EMS, or from a first NMS to a second NMS. When an issue arises on the service provider network, it may be difficult, inefficient, and time consuming to gather information such as vendor documents and experiment with methods to resolve the problem. Contributors assigned to troubleshoot the issue may be unfamiliar with the network equipment element and/or the nature of the issue that has occurred. The time spent on the trouble case may lead to more money and resources being spent by a company to fix the problem.

SUMMARY

In an embodiment, a communication network operations center (NOC) monitoring and repairing system is disclosed. The system comprises a processor, a non-transitory memory, and an application stored in the non-transitory memory. When executed by the processor the application reads information about network equipment from a network equipment inventory data store, identifies enhanced node B (eNB) devices that have a fiber optic backhaul physical interface based on the information about network equipment read from the network equipment inventory data store, and identifies eNB devices that have a wireless physical interface based on the information about network equipment read from the network equipment inventory data store. The application further analyzes Internet protocol (IP) routing configurations based on the information about network equipment read from the network equipment inventory data store to determine network layer relationships among eNB devices, determines a backhaul network topology based on the eNB devices identified to have fiber optic backhaul interfaces, the eNB devices that have wireless interfaces, and based on the network layer relationships among the eNB devices, and based on the backhaul network topology takes action.

In another embodiment, a method of managing a mobile communication radio access network (RAN) is disclosed. The method comprises reading information about network equipment from a network equipment inventory data store by an application executing on a computer system and, based on the information about network equipment read form the network equipment inventory data store, determining a backhaul network topology by the application, wherein a plurality of donor enhanced node B (eNB) devices provide backhaul communication coupling to one or more local exchange carrier (LEC) to a plurality of eNB devices. The method further comprises analyzing a performance history of the network equipment by the application based on the backhaul network topology and adapting a build-out of new equipment being added to extend the network equipment based on the analyzing of the performance history.

In yet another embodiment, a method of managing a mobile communication radio access network (RAN) is disclosed. The method comprises reading information about network equipment from a network equipment inventory data store by an application executing on a computer system, where the information comprise at least three of an identification of the network equipment items, an identification of vendors of the network equipment items, a software version identity of the network equipment items, a hardware version identity of the network equipment items, a firmware version identity of the network equipment items, a topological relationship of the network equipment items to other network equipment items. The method further comprises identifying enhanced node B (eNB) devices among the network equipment items that have a fiber optic backhaul physical interface by the application based on the information about network equipment read from the network equipment inventory data store, where the eNB devices having the fiber optic backhaul physical interface are donor eNBs and identifying eNB devices among the network equipment items that have a microwave physical interface by the application based on the information about network equipment read from the network equipment inventory data store. The method further comprises identifying eNB devices that have a microwave physical interface that are not donor eNBs as child eNB devices by the application based on the information about network equipment read from the network equipment inventory data store, and, for each child eNB device, identifying by the application a donor eNB device that provides backhaul communication coupling to a local exchange carrier (LEC) to the child eNB device and determining by the application a topological relationship of the child eNB to the donor eNB.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
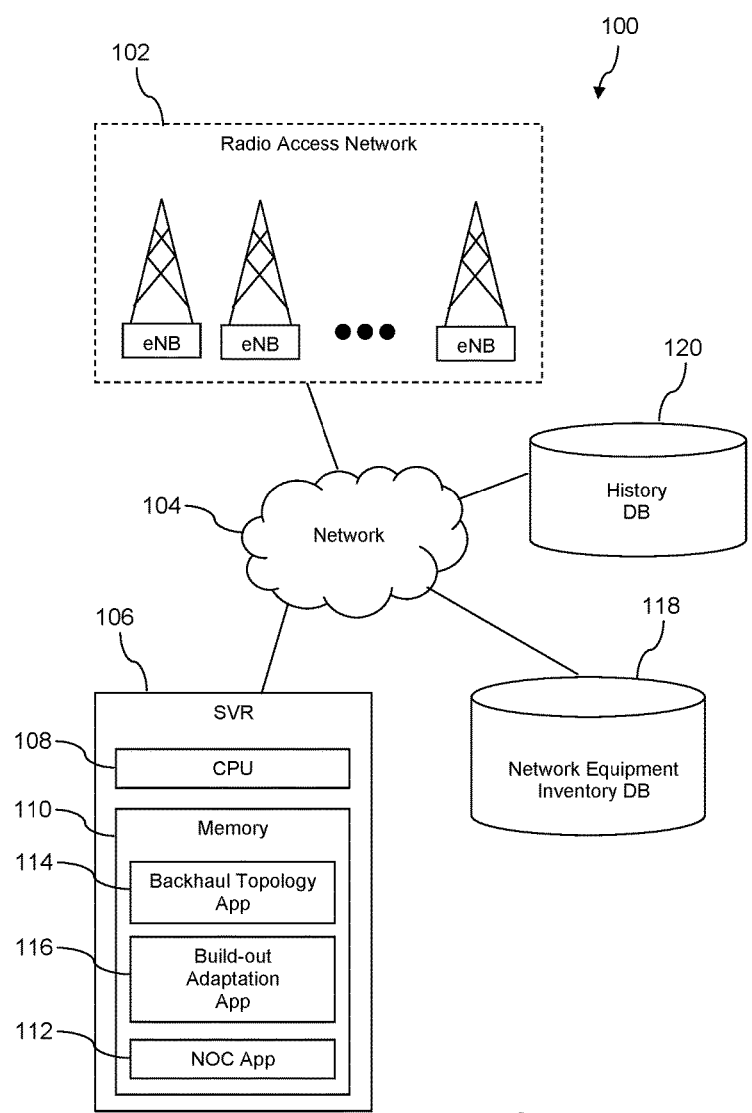
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In a mobile communication network, enhanced node Bs (eNBs), base transceiver stations (BTSs), or cell towers communicatively couple mobile communication devices to a static fixed-in-place core communication network. The eNBs provide a wireless communication link to the mobile communication device and couple to the core network via a communication facility comprising a fiber optic line or a transmission line such as a coaxial cable or wave guide. The communication facility, which is commonly referred to as a "backhaul" facility, links the radio access network (RAN) provided by eNBs to a local exchange carrier (LEC). The LECs may charge recurring costs to a mobile communication service provider for providing the communication facility, costs that may amount to a significant portion of operating costs for the mobile communication service provider.

To reduce operating costs and to provide other advantages, a RAN may be configured so that some eNBs provide backhaul for other eNBs. The eNB connected to the backhaul facility (e.g., fiber line) may be referred to as a donor eNB or a parent eNB. The eNBs that receive backhaul via the donor eNB may be referred to as child eNBs. For example, a parent eNB may establish a wireless communication link via a microwave facility with a child eNB. When the child eNB desires to backhaul communication traffic (send or receive voice or data partly through the core network), the child eNB communicates with the donor eNB via the microwave facility, and the donor eNB supports the child eNB backhaul communication traffic using its own (the donor eNB's) backhaul facility. In this case (1 donor eNB supporting 1 child eNB), backhaul operating costs can be halved. A variety of backhaul donor topologies can be deployed that further reduce these operating costs. For example, a single donor eNB may support backhaul for 3 child eNBs. In this case, backhaul operating costs can be quartered.

The network topology of RAN backhaul complicates the task of monitoring and managing the wireless mobile communication network. The present disclosure teaches a system and methods for automatically mapping or discovering the backhaul network topology and using that information in a network operations center (NOC) tool to improve monitoring and managing the RAN. As used herein, the term topology means the communication paths and circuits among and between communication nodes, for example among eNBs, and via backhaul facilities to the core network.

Depending on a backhaul topology for any related group of eNBs (which may be referred to as a mini-network), alarms presented by a NOC tool that does not take account of the backhaul topology may be misleading. For example, a communication fault at the donor eNB may result in alarms being presented by the NOC tool for all the children eNBs associated with that donor eNB. This may confuse NOC operators and delay troubleshooting the problem. As another example, in a ring of child eNBs, redundant communication links may be provided so the donor eNB can communicate with child eNBs in the ring in either ring direction. If an inactive communication link (the redundant path) is out of service but not identified as such by the NOC tool, due to its indifference to the backhaul topology, the NOC tool may not properly alert that the reliability of the subject ring of eNBs is compromised and ought to be maintained. By mapping backhaul topologies of eNBs in the RAN and by adapting the NOC tool accordingly, these conditions can be taken account of and the RAN may be better maintained and operated.

A backhaul topology application may execute on a computer system and analyze a variety of information about the RAN to determine backhaul topologies coupled to donor eNBs in the RAN. For example, the backhaul topology application can read from or access a network equipment inventory data store that stores a wide variety of information about network equipment. This equipment inventory information may be sensed or captured from equipment items by other monitoring tools that may log into different vendor equipment management tools. This equipment inventory information may comprise, for example, identification of the network equipment items, identification of the vendors of the equipment, and identification of software and/or hardware versions of the equipment. The equipment inventory information may comprise hierarchical relationships among the equipment, for example indicating that a subsystem is subordinated within an identified eNB, indicating that a component is subordinated within an identified subsystem, and indicating that a subcomponent is subordinated within an identified component. These hierarchical relationships may be referred to as topological relationships, and the mapping of backhaul topologies disclosed herein may be considered to be an extension of or complementary to these hierarchical relationships. The backhaul topology application may, for example, analyze physical interface identifiers maintained in the network equipment inventory data store.

The backhaul topology application may further analyze Internet protocol (IP) routing configurations and IP routing tables maintained by IP routers in the RAN, for example to determine IP subnets associated with eNBs. The backhaul topology application may reach out to each of the IP routers in turn to extract the IP routing tables or may read the IP routing configuration information from a central data store. The backhaul topology application may analyze virtual local area network (VLAN) facilities that are provisioned in the RAN. The backhaul topology application can combine the information learned from the network inventory data store (physical communication layer), the information learned from the IP routing tables and IP routing configurations (network communication layer), and the information learned about VLAN facilities (data link communication layer) to determine backhaul topologies in the RAN. It is understood that obtaining this information related to three different communication layers (i.e., physical layer, data link layer, and network layer) may involve separate and distinct processing steps and accessing different sources of information for each different communication layer.

For example, the physical layer information can indicate that a first eNB has a microwave physical interface named "txmck5ghzenb7" that links to a far end microwave interface named "txmck5ghzenb6"; and a second eNB has a microwave interface named "txmck5ghzenb6" that links to a far end microwave physical interface named "txmck5ghzenb7". This information implies the first and second eNBs are communicatively coupled to each other via a microwave wireless link. Further information about the topological relationship between the first and second eNB may be determined from looking at the IP subnet routing relationships and any VLAN relationships between the two eNBs. The presence of a fiber Ethernet physical interface in an eNB can be used to determine that the subject eNB is a donor eNB.

The information obtained from analyzing the RAN based on physical layer, data link layer, and network layer information can be used in combination with an enumerated list of potential donor-child topologies. For example, the backhaul topology application can attempt to confirm that information associated with a set of eNBs is consistent with a first topology. If the information is inconsistent with the first topology, the application may attempt to confirm that the information is consistent with a second topology. And so on until the topology of a donor eNB and its associated child eNBs is determined. While the subject of topologies is discussed further herein after, some of the topologies include a ring topology, a spike topology, and a hub topology.

When the topologies of all donor eNBs and their associated child eNBs is known, the behavior of the NOC tool can be aligned with that topology. For example, the NOC tool may detect the failure of an inactive redundant communication link in a donor-child eNB ring and present an associated alarm. It is observed that formerly this failure may have been overlooked because the communication link was inactive and hence formally was not failing to support communication function because it was not being called upon to carry communication content. Detecting this condition and raising it to the attention of a NOC operator can help assure the backhaul robustness that is expected when investing in providing the hardware infrastructure for these redundant links.

As another example, the NOC tool may detect a communication failure across each of the donor eNB and associated child eNBs in the same mini-network and alarm only on the donor eNB and suppress alarm conditions reported on the associated child eNBs. This may be referred to in some contexts as collapsing or consolidating alarms. For example, the NOC tool may automatically open a single trouble ticket identifying the donor eNB and each of the donor's child eNBs in the same mini-network versus opening multiple trouble tickets on what is likely a unified fault. This may be referred to in some contexts as collapsing or consolidating multiple trouble tickets. For further details about a network operations center (NOC) management system, see U.S. patent application Ser. No. 14/920,874, filed Oct. 23, 2015, entitled "Communication Network Operations Management System and Method," by Kevin V. Jadunandan, et al., which is incorporated herein by reference in its entirety.

The NOC tool can identify potential problems in mini-network backhaul and drive upgrades to redress the problems. For example, if analysis of communication performance statistics of a mini-network exhibit backhaul failures in excess of a predefined threshold and if the mini-network is provided backhaul connectivity through a single donor eNB, a second donor eNB may be provided for the mini-network. For example, one of the eNB s of the mini-network may receive an upgrade to install a fiber optic backhaul interface to provide a redundant backhaul resource for the mini-network. The analysis may take into account the traffic volumes supported by the eNBs in the mini-network and/or the imputed value of the traffic supported by the eNBs. Thus, a more stringent backhaul reliability may be used to determine the predefined threshold in a mini-network that supports a higher volume of traffic and/or a higher imputed value of traffic.

The backhaul topology mapping can also be used to analyze the performance of a donor eNB to child eNB topology in specific locations, based on a history of RAN performance, a history of trouble tickets, a history of maintenance, and other history and make recommendations for future build-out of the RAN in the same location or in different but similar locations. This analysis may be performed by a build-out application executing on a computer system. The RAN may undergo a number of build-outs over time, for example as new generations of wireless technology are deployed. Additionally, due to the vast size of a typical RAN (e.g., in excess of 10,000 cell towers), build-outs may occur as a rolling, wave-like process.

The analysis performed by the backhaul topology application may be performed periodically, for example once per day, once per week, once per month, once per quarter, or on some other periodic interval. The network equipment inventory data store may be updated periodically, for example once per day, once per week, once per month, or on some other periodic interval. The information in the network equipment inventory data store will change because RAN build-outs may be on-going and because equipment is replaced and modified on an ongoing basis, software updates may be deployed, IP routing may alter, operating parameters such as antenna tilts may be adapted. The result of the backhaul topology application may be incorporated into the network equipment inventory data store, as backhaul topology information.

Turning now to FIG. 1, a communication system 100 is described. In an embodiment, system 100 comprises a radio access network (RAN) 102, a network 104, and a computer system 106. The RAN 102 comprises a plurality of eNBs, base transceiver stations (BTSs), or cell towers. The eNBs support mobile communication according to one of a long term evolution (LTE), a code division multiple access (CDMA), a global system for mobile communication (GSM), or a worldwide interoperability for microwave access (WiMAX) wireless communication protocol. The RAN 102 may comprise other equipment items not shown in FIG. 1 such as Internet protocol (IP) aggregators and other equipment.

The computer system 106 comprises a processor 108 and a memory 110. The memory 110 may comprise a non-transitory portion and a transitory portion. Computers are discussed further hereinafter. A network operations center (NOC) application 112, a backhaul topology application 114, and a build-out adaptation application 116 may be stored in the non-transitory portion of the memory 110. In an embodiment, the NOC application 112, the backhaul topology application 114, or the build-out adaptation application 116 may be loaded by the processor 108 into the transitory portion of memory 110 before executing the subject application. In an embodiment, the applications 112, 114, and 116 may be installed and executed on two or more different computer systems. For example, the NOC application 112 may execute on a first computer system and the backhaul topology application 114 and the build-out adaptation application 116 may execute on a second computer system. In some contexts, the computer system 106 may be referred to as a NOC monitoring and repairing system.

The network 104 may be one or more private networks, one or more public networks, or a combination thereof. At least part of the network 104 comprises a local exchange carrier (LEC) network or a plurality of LEC networks. For example, in different parts of the United States, different LEC networks may be deployed. While a single link is drawn between the RAN 102 and the network 104 in FIG. 1, it is understood that there are a large number of backhaul links between enhanced node Bs (eNBs) in the RAN 102 and the network 104.

The system 100 further comprises a network equipment inventory data store 118. The network equipment inventory data store 118 comprises a variety of information about the network equipment items that provides the infrastructure for supporting mobile communications. This equipment comprises eNBs, base transceiver stations (BTSs), or cell towers. This equipment comprises auxiliary or support equipment associated with eNBs or cell towers such as antennas, remote radio heads (RRHs), battery back-up equipment, emergency electrical power generation equipment, equipment shack environmental monitoring equipment, door open monitoring equipment, and the like. This equipment comprises IP routers. This equipment comprises IP aggregators. The information in the network equipment inventory data store 118 comprises identification of the network equipment items, identification of the vendors of the equipment, and identification of software and/or hardware versions of the equipment.

The information in the network equipment inventory data store 118 may comprise hierarchical relationships among the equipment, for example indicating that a subsystem is subordinated within an identified eNB, indicating that a component is subordinated within an identified subsystem, and indicating that a subcomponent is subordinated within an identified component. These hierarchical relationships may be referred to as topological relationships, and the mapping of backhaul topologies disclosed herein may be considered to be an extension of or complementary to these hierarchical relationships. As described further herein, information about equipment topological relationships may be employed to identify backhaul topologies.

The system 100 may further comprise a history data store 120. The history data store 120 may comprise a plurality of separate data stores or be a single integrated data store. The history data store 120 may comprise information on RAN performance history, RAN trouble ticket history, maintenance history, and other information.

Turning to FIG. 2A, FIG. 2B, FIG. 2C, and FIG. 2D, a plurality of exemplary backhaul topology categories are described. It is understood that the present disclosure contemplates other backhaul topology categories than those specifically illustrated and described herein. To some extent alternative backhaul topologies can be viewed as minor extensions or variations of the specific backhaul topology examples described here.

Figure 2A:
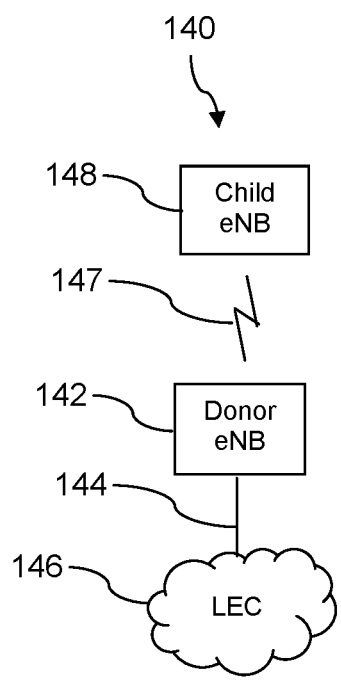
FIG. 2A is a block diagram of a backhaul network topology according to an embodiment of the disclosure.

In FIG. 2A, a first backhaul topology 140 is described. A donor eNB 142 provides a backhaul link 144 to a local exchange carrier (LEC) network 146. The donor eNB 142 provides a wireless link 147 to a first child eNB 148. The backhaul link to the LEC 146 for the first child eNB 148 is provided via the wireless link 147 by the donor eNB 142. The first child eNB 148 in the first backhaul topology 140 may be referred to as a remote site. The first backhaul topology 140 may be referred to as a stick topology. The wireless link 147 may comprise a first radio link used by the donor eNB 142 to transmit to the first child eNB 148 and a second radio link used by the donor eNB 142 to receive from the first child eNB 148 (i.e., in half duplex). The first and second radio links may be provided on different frequency bands (frequency division multiplexing) or on the same frequency band in different timed frames (time division multiplexing). In the event of a failure of one of the radio links, the active radio link may be employed to both transmit and receive (i.e., in full duplex). Alternatively, the wireless link 147 may be a single radio link used in full duplex. In some contexts, the wireless link 147 may be referred to as a microwave link. The comments above about the wireless link 147 may apply to the other wireless links described below.

Figure 2B:
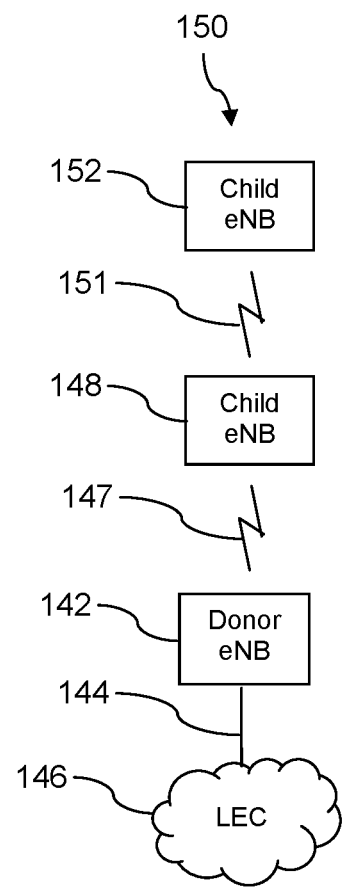
FIG. 2B is a block diagram of another backhaul network topology according to an embodiment of the disclosure.

In FIG. 2B, a second backhaul topology 150 is described. The donor eNB 142 provides the backhaul link 144 to the LEC network 146. The donor eNB 142 provides the wireless link 147 to the first child eNB 148, and the first child 148 in turn provides a wireless link 151 to a second child eNB 152. The second child eNB 152 receives backhaul from the first child eNB 148 which receives backhaul (for both the second child eNB 152 and for itself) from the donor eNB 142. The second child eNB 152 may be referred to as a remote site, and the second child eNB 152 may be referred to as a spur node.

Figure 2C:
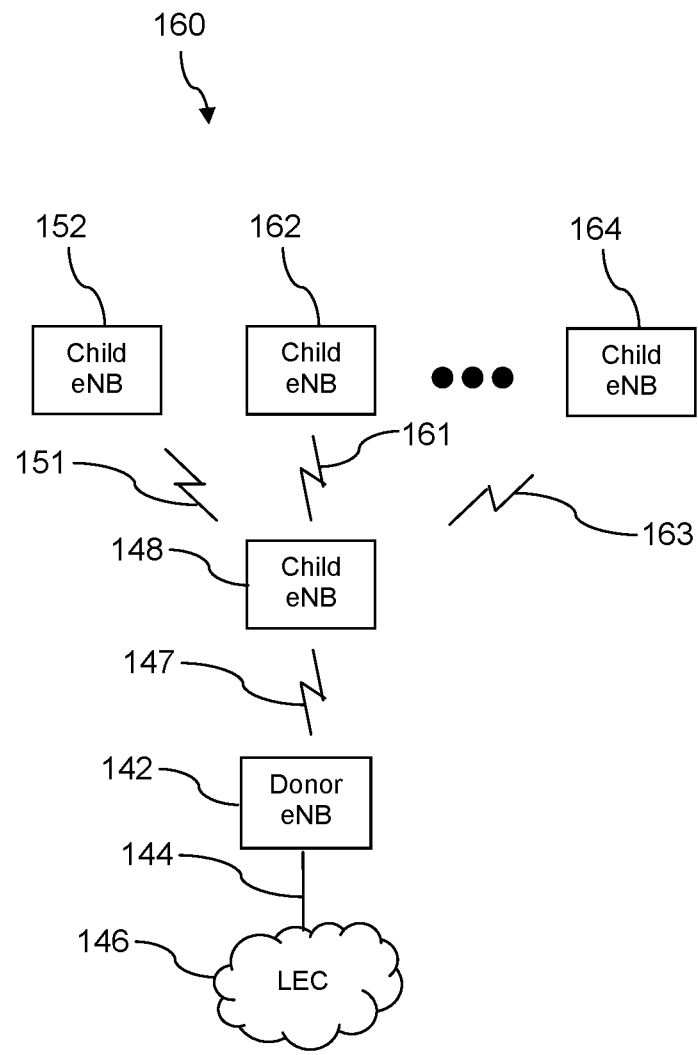
FIG. 2C is a block diagram of still another backhaul network topology according to an embodiment of the disclosure.

In FIG. 2C, a third backhaul topology 160 is described. The donor eNB 142 provides the backhaul link 144 to the LEC network 146. The donor eNB 142 provides backhaul support via the wireless link 147 to the first child eNB 148. The first child eNB 148 in turn provides backhaul support via the wireless link 151 to the second child eNB 152, via a wireless link 161 to a third child eNB 162, and via a wireless link 163 to a fourth child eNB 164. In the third backhaul topology 160, the first child eNB 148 may be referred to as a hub site, and the third backhaul topology 160 may be referred to as a hub and spoke topology. As suggested by the series of black dots, the first child eNB 148 may provide backhaul support to more than three child eNBs.

Figure 2D:
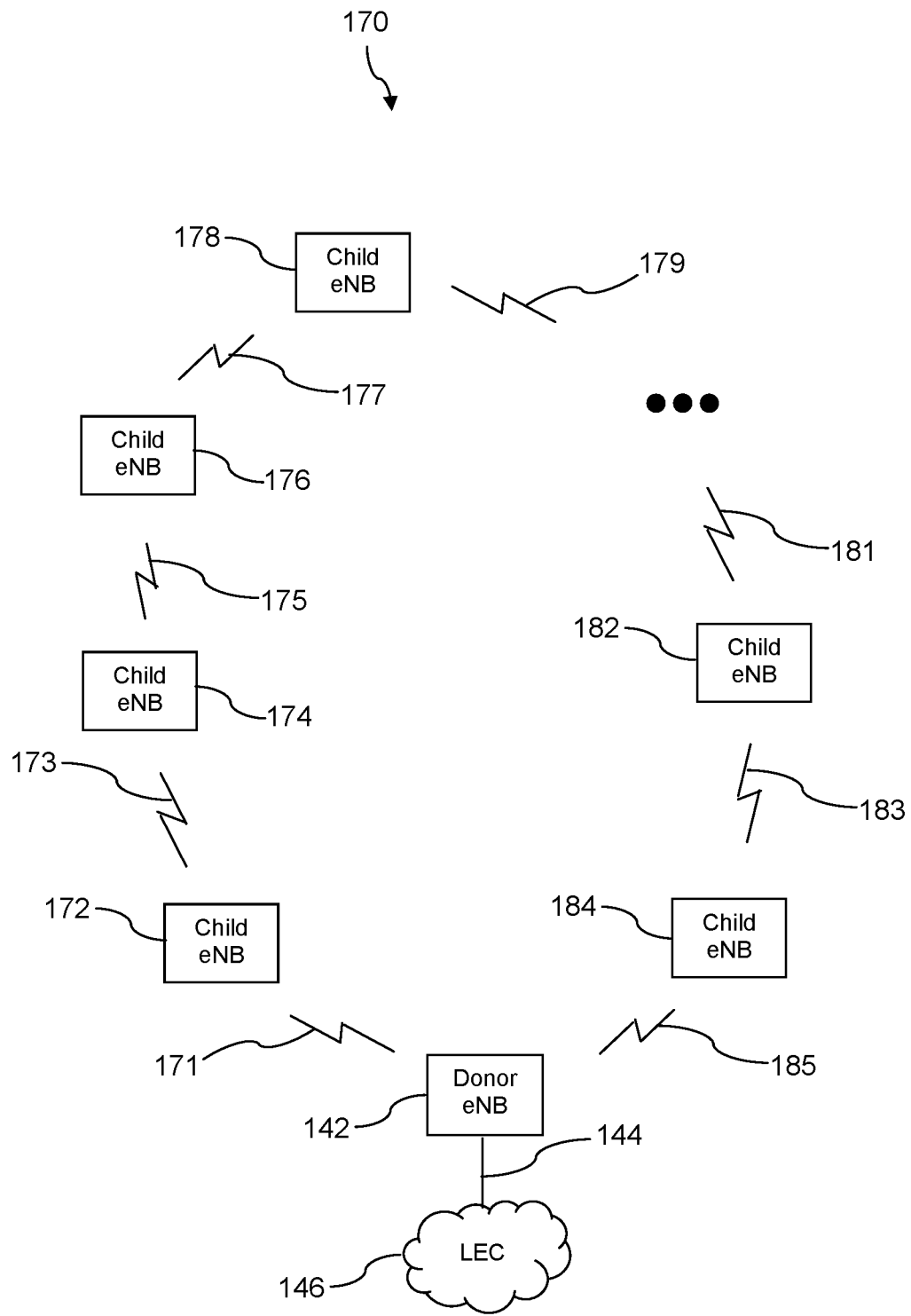
FIG. 2D is a block diagram of yet another backhaul network topology according to an embodiment of the disclosure.

In FIG. 2D, a fourth backhaul topology 170 is described. The donor eNB 142 provides the backhaul link 144 to the LEC network 146. The donor eNB 142 provides backhaul support via a wireless link 171 to a fifth child eNB 172 and provides backhaul support via a wireless link 185 to a sixth child eNB 184. The fifth child eNB 172 provides backhaul support via a wireless link 173 to a seventh child eNB 174. The sixth child eNB 184 provides backhaul support via a wireless link 183 to an eighth child eNB 182. The seventh child eNB 174 provides backhaul support via a wireless link 175 to a ninth child eNB 176. The eighth child eNB 182 provides backhaul support via a wireless link 181 to some other undefined eNB in the fourth backhaul topology 160. The ninth child eNB 176 provides backhaul support via a wireless link 177 to a tenth child eNB 178. The tenth child eNB 178 provides backhaul support via a wireless link 179 to an undefined eNB in the fourth backhaul topology 160. The fourth backhaul topology 160 may be referred to as a ring backhaul topology.

It is understood that while a specific backhaul arrangement is described above for the fourth backhaul topology 170, other backhaul arrangements are consistent with the fourth backhaul topology 170. For example, eNB 184 may receive backhaul support via eNB 182, eNB 182 may receive backhaul support (indirectly) via eNB 178, eNB 178 may receive backhaul support via eNB 176, eNB 176 may receive backhaul support via eNB 174, eNB 174 may receive backhaul support via eNB 172, and eNB 172 may receive backhaul support via eNB 142. This alternate backhaul arrangement may be utilized if the wireless link 185 goes down, for example if a wireless physical interface supporting link 185 fails at the donor eNB 142 or if a wireless physical interface supporting link 185 fails at the eNB 184. In an embodiment, the fourth backhaul topology 170 may comprise a second donor eNB coupled to the LEC network 146 by a different backhaul link (e.g., a different fiber link). This alternative configuration may promote improved reliability for the backhaul ring as well as improved performance by unloading some of the backhaul traffic from the backhaul link 144.

Figure 3:
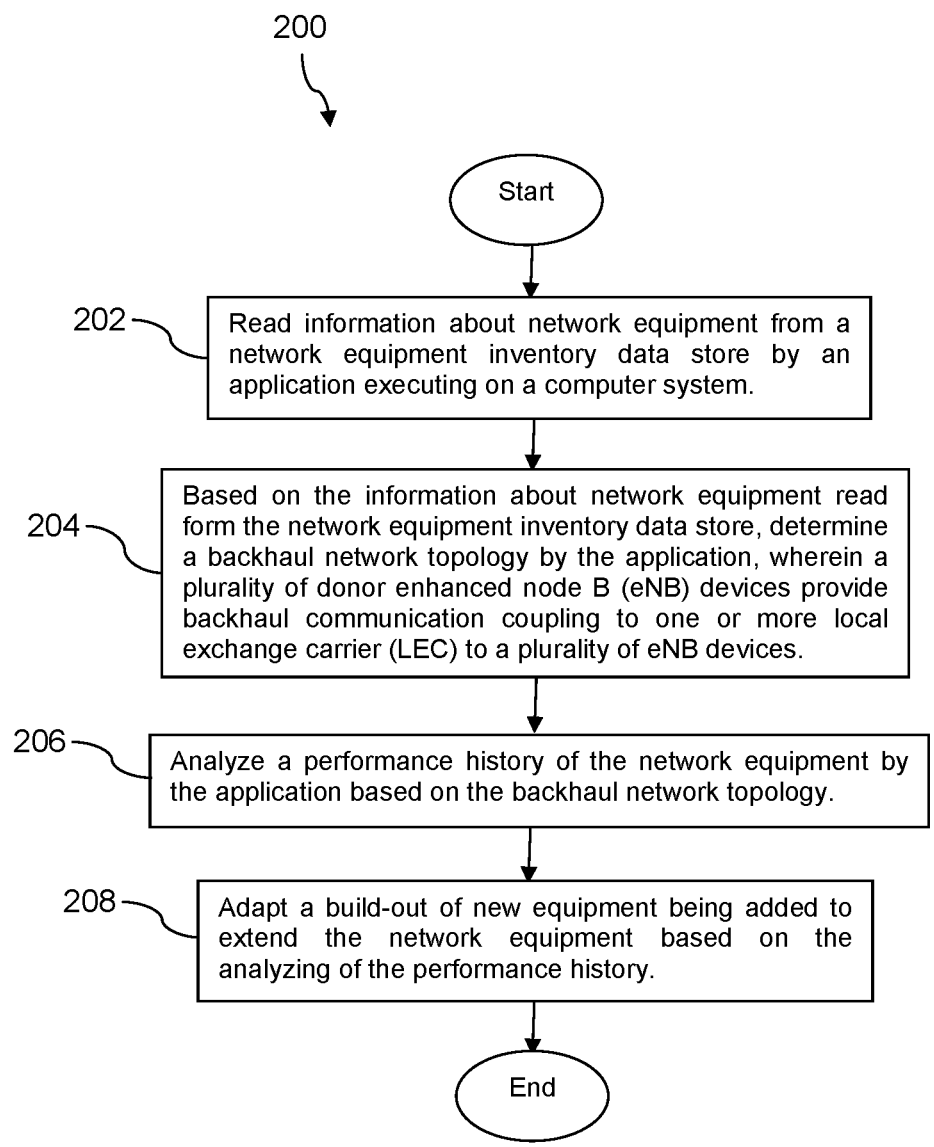
FIG. 3 is a flow chart of a method according to an embodiment of the disclosure.

Turning now to FIG. 3, a method 200 is described. At block 202, read information about network equipment from a network equipment inventory data store by an application executing on a computer system. For example, the backhaul topology application 114 reads network equipment inventory information from the network equipment inventory data store 118. This information may comprise a wide variety of information about RAN equipment, for example, identification of the network equipment items, identification of the vendors of the equipment, and identification of software and/or hardware versions of the equipment. The equipment inventory information may comprise hierarchical relationships among the equipment. The equipment inventory information may identify physical interfaces of eNBs in the RAN and far-end identities of what nodes are connected to the physical interfaces of the eNBs, for example far-ends of microwave radio physical interfaces of eNBs.

At block 204, based on the information about network equipment read from the network equipment inventory data store, determine a backhaul network topology by the application, wherein a plurality of donor enhanced node B (eNB) devices provide backhaul communication coupling to one or more local exchange carrier (LEC) to a plurality of eNB devices. The processing of block 204 comprises identifying eNBs that are associated with a common mini-network and then deducing a topology of the eNBs that are members of that mini-network. For example, eNBs that have no fiber physical interface may be deduced to be child eNBs and eNBs that have a fiber physical interface may be deduced to be donor eNBs. The child eNBs that receive backhaul support from that donor eNB may be said to belong to the same mini-network and can be identified by what eNBs their wireless physical interfaces couple to (e.g., far-end physical interface identity). In an embodiment, when a mini-network has been identified and associated with a specific backhaul topology, the membership in that mini-network and backhaul topology may be stored and may be used as an initial guess for deducing the backhaul topology of that mini-network during the next iteration of the method 200.

At block 206, analyze a performance history of the network equipment by the application based on the backhaul network topology. In an embodiment, the processing of block 206 may be performed by an application different from the application that performs the processing of blocks 202 and 204. For example the processing of block 206 may be performed by the build-out adaptation application 116 described above with reference to FIG. 1. The processing of block 206 may analyze information stored in the history data store 120, for example RAN performance history, trouble ticket history, maintenance history, and other history. The analysis may determine that some backhaul topologies result in more reliable performance than different backhaul topologies for specific network scenarios or categories (e.g., urban environment, rural environment, rapidly developing environment, seasonally sensitive environment such as a school or university, hilly area, heavily treed area, etc.).

At block 208, adapt a build-out of new equipment being added to extend the network equipment based on the analyzing of the performance history. In an embodiment, the processing of block 208 may be performed by engineers. Alternatively, in an embodiment the processing of block 208 may be performed by an application executing on a computer system. For example, if performance of a mini-network of eNBs sharing a common backhaul donor eNB drops below a predefined threshold, the application may model or estimate performance of the mini-network if a different backhaul topology is used. For example, a second donor eNB may be configured for a mini-network ring backhaul topology. For example, a remote eNB may be provided with a direct backhaul link to the LEC, for example provided with a fiber link to the LEC. For example, a second set of wireless links may be added between child eNBs and donor eNBs in a mini-network of eNBs.

Figure 4:
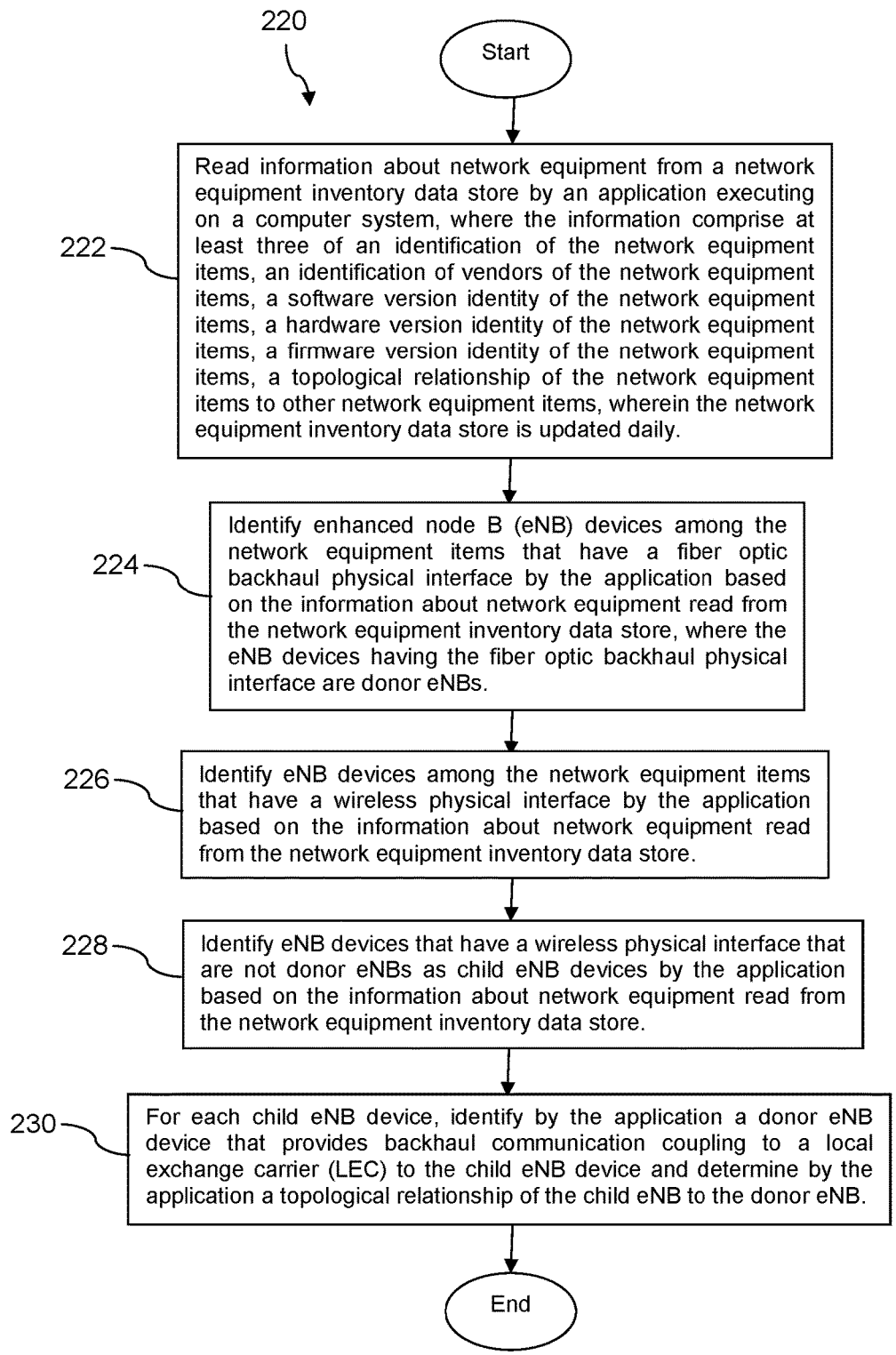
FIG. 4 is a flow chart of another method according to an embodiment of the disclosure.

Turning now to FIG. 4, a method 220 is described. At block 222, read information about network equipment from a network equipment inventory data store by an application executing on a computer system, where the information comprises at least three of an identification of the network equipment items, an identification of vendors of the network equipment items, a software version identity of the network equipment items, a hardware version identity of the network equipment items, a firmware version identity of the network equipment items, a topological relationship of the network equipment items to other network equipment items, wherein the network equipment inventory data store is updated daily. For example, the backhaul topology application 114 executes on computer system 106 and reads the information from the network equipment inventory data store 118.

At block 224, identify enhanced node B (eNB) devices among the network equipment items that have a fiber optic backhaul physical interface by the application based on the information about network equipment read from the network equipment inventory data store, where the eNB devices having the fiber optic backhaul physical interface are donor eNBs. At block 226, identify eNB devices among the network equipment items that have a wireless physical interface by the application based on the information about network equipment read from the network equipment inventory data store. For example, identify eNB devices among the network equipment items that have a microwave physical interface by the application based on the information about network equipment read from the network equipment inventory data store. At block 228, identify eNB devices that have a wireless physical interface that are not donor eNBs as child eNB devices by the application based on the information about network equipment read from the network equipment inventory data store. At block 230, for each child eNB device, identify by the application a donor eNB device that provides backhaul communication coupling to a local exchange carrier (LEC) to the child eNB device and determine by the application a topological relationship of the child eNB to the donor eNB. As described above, this process may comprise first grouping eNBs within a plurality of mini-networks and then successively deducing a topology within the mini-networks by looking at physical interfaces (physical layer analysis), looking at IP subnet routing (network layer analysis), and looping at any VLAN information (data link layer analysis).

Figure 5:
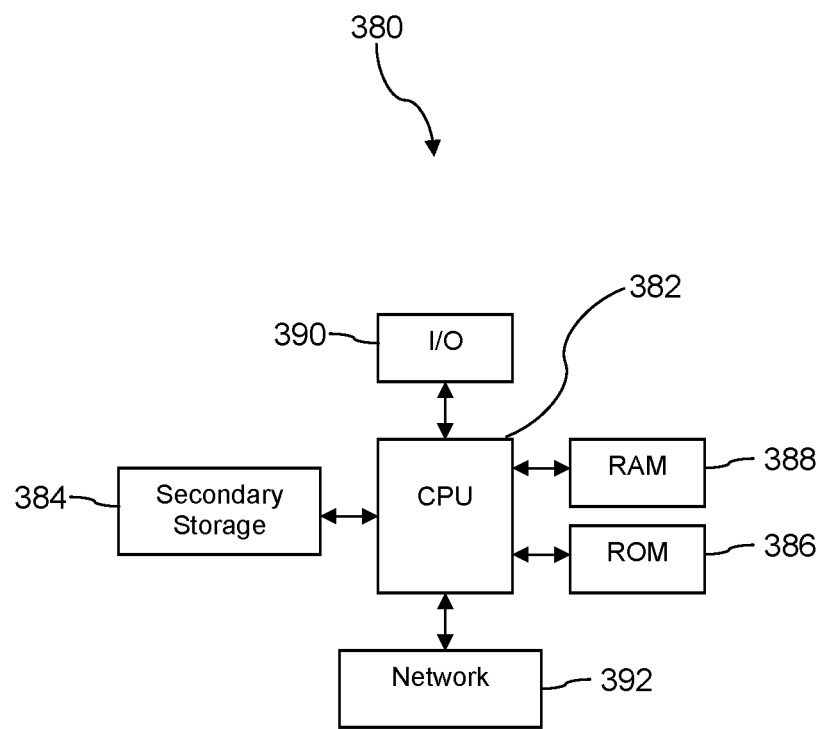
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing a mobile communication radio access network (RAN), comprising:

reading information about network equipment from a network equipment inventory data store by an application executing on a computer system, where the information comprises at least three of an identification of the network equipment items, an identification of vendors of the network equipment items, a software version identity of the network equipment items, a hardware version identity of the network equipment items, a firmware version identity of the network equipment items, a topological relationship of the network equipment items to other network equipment items;

identifying enhanced node B (eNB) devices among the network equipment items that have a fiber optic backhaul physical interface by the application based on the information about network equipment read from the network equipment inventory data store, where the eNB devices having the fiber optic backhaul physical interface are donor eNBs;

identifying eNB devices among the network equipment items that have a microwave physical interface by the application based on the information about network equipment read from the network equipment inventory data store;

identifying eNB devices that have a microwave physical interface that are not donor eNBs as child eNB devices by the application based on the information about network equipment read from the network equipment inventory data store; and for each child eNB device, based on the physical interfaces, identifying by the application a donor eNB device that provides backhaul communication coupling to a local exchange carrier (LEC) to the child eNB device and determining by the application a topological relationship of the child eNB to the donor eNB.

2. The method of claim 1, further comprising analyzing Internet protocol (IP) routing configurations based on the information about network equipment read from the network equipment inventory data store to determine network layer relationships among eNB devices, wherein identifying a donor eNB device for each child eNB device and determining a topological relationship of the child eNB to the donor eNB is based at least in part on analyzing IP routing configurations.

3. The method of claim 2, wherein analyzing IP subnet information read from routing tables and from routing configurations in the network equipment inventory data store.

4. The method of claim 2, further comprising analyzing virtual local area network (VLAN) facilities associated with the eNBs based on the information about network equipment read from the network inventory data store, wherein identifying a donor eNB device for each child eNB device and determining a topological relationship of the child eNB to the donor eNB is based at least in part on analyzing VLAN facilities associated with the eNBs.

5. The method of claim 1, further comprising collapsing alarms associated with a plurality of child eNBs associated with the same donor eNB in a network operation management (NOC) user interface.

6. The method of claim 5, further comprising:
analyzing a performance history of the network equipment; and
providing a fiber optic backhaul physical interface to an eNB, where the eNB formerly was a child eNB, based on the analyzing the performance history.

7. A method of managing a mobile communication radio access network (RAN), comprising:
reading information about network equipment from a network equipment inventory data store by an application executing on a computer system;
based on the information about network equipment read from the network equipment inventory data store, identifying enhanced node B (eNB) devices that have a fiber optic backhaul physical interface by the application and determining a backhaul network topology by the application at least partly based on the eNB devices identified to have fiber optic backhaul interfaces, wherein the eNB devices having the fiber optic backhaul interfaces are donor eNB devices that provide backhaul communication coupling to one or more local exchange carrier (LEC) to a plurality of eNB devices;

analyzing a performance history of the network equipment by the application based on the backhaul network topology; and
adapting a build-out of new equipment being added to extend the network equipment based on the analyzing of the performance history.

8. The method of claim 7, wherein the backhaul network topology is determined at least partly based on analyzing physical communication layer information associated with the eNB devices read from the network equipment inventory data store.

9. The method of claim 8, wherein the backhaul network topology is determined at least partly based on analyzing IP subnet information associated with the eNB devices read from the network equipment inventory data store.

10. The method of claim 9, wherein the backhaul network topology is determined at least partly based on analyzing virtual local area network (VLAN) information associated with the eNB devices read from the network equipment inventory data store.

11. The method of claim 7, wherein adapting a build-out of new equipment comprises adding a second donor eNB device to a first donor eNB device for a ring of child eNB devices, where a donor eNB device has a fiber backhaul communication link to a local exchange carrier (LEC) network and provides backhaul support for child eNB devices that do not have a fiber physical interface.

12. The method of claim 7, wherein adapting a build-out of new equipment comprises adding a second set of wireless links between child eNB devices and a donor eNB for a ring of child eNB devices.

13. The method of claim 7, further comprising providing an eNB with a fiber backhaul communication link to a local exchange carrier (LEC) network based on the analyzing of the performance history, wherein formerly the eNB had no fiber physical interface and received backhaul support from a donor eNB that has a fiber link to the LEC network.

14. A communication network operations center (NOC) monitoring and repairing system, comprising:
a processor;
a non-transitory memory; and
an application stored in the non-transitory memory that, when executed by the processor
reads information about network equipment from a network equipment inventory data store,
identifies enhanced node B (eNB) devices that have a fiber optic backhaul physical interface based on the information about network equipment read from the network equipment inventory data store,
identifies eNB devices that have a wireless physical interface based on the information about network equipment read from the network equipment inventory data store,
analyzes Internet protocol (IP) routing configurations based on the information about network equipment read from the network equipment inventory data store to determine network layer relationships among eNB devices,
determines a backhaul network topology based on the eNB devices identified to have fiber optic backhaul interfaces, the eNB devices that have wireless interfaces, and based on the network layer relationships among the eNB devices, and
based on the backhaul network topology takes action.

15. The NOC monitoring and repairing system of claim 14, wherein taking action comprises collapsing multiple alarm conditions associated with a plurality of eNB devices to a single alarm associated with an donor eNB device having a fiber optic backhaul physical interface that was determined to provide backhaul service to a plurality of eNBs based on the backhaul network topology.

16. The NOC monitoring and repairing system of claim 15, wherein taking action further comprises generating a single trouble ticket identifying the donor eNB device associated with the single alarm and identifying the plurality of eNB devices that receive backhaul service from the donor eNB.

17. The NOC monitoring and repairing system of claim 14, wherein taking action comprises detecting that a backup link of a plurality of eNB devices coupled to a donor eNB device is out of service and presenting an alarm, where the donor eNB device provides backhaul service for those eNB devices through a fiber optic interface of the donor eNB device.

18. The NOC monitoring and repairing system of claim 14, wherein the information read from the network equipment inventory data store comprises at least three of an identification of the network equipment items, an identification of vendors of the network equipment items, a software version identity of the network equipment items, a hardware version identity of the network equipment items, a firmware version identity of the network equipment items, a topological relationship of the network equipment items to other network equipment items.

19. The NOC monitoring and repairing system of claim 14, wherein the backhaul interfaces provide a communication link between eNB devices and a local exchange carrier (LEC) network.

20. The NOC monitoring and repairing system of claim 14, wherein the application further analyzes virtual local area network (VLAN) facilities of the network equipment and where the application further determines the backhaul network topology based on the VLAN facilities.

* * * * *